United States Patent Office 3,694,322
Patented Sept. 26, 1972

3,694,322
METHOD FOR SEPARATING ACRYLONITRILE AND ACETONITRILE BY EXTRACTIVE DISTILLATION WITH COOLANT VAPOR GENERATION
Yoneichi Ikeda, Tsukasa Takeda, Michio Hattori, Yutaka Kiyomiya, and Takashi Yamamoto, Yokohama, Japan, assignors to Nitto Chemical Industry Co., Ltd., Tokyo, Japan
Filed Nov. 7, 1968, Ser. No. 774,133
Claims priority, application Japan, Nov. 8, 1967, 42/71,839; Apr. 30, 1968, 43/28,555
Int. Cl. B01d 3/40; C07c 121/32
U.S. Cl. 203—25                                             15 Claims

ABSTRACT OF THE DISCLOSURE

Acrylonitrile and acetonitrile are separated individually from an aqueous solution containing acrylonitrile and acetonitrile using a combination of an extractive distillation column for recovery of acrylonitrile using water as an extracting agent and a stripping column for recovery of acetonitrile. The distillation of said stripping column is conducted under pressure, so that, at least one portion of overhead vapours evolved from the top of said stripping column may be condensed in a condenser at a temperature high enough to allow the condensation of said vapours to boil the cooling liquid in the condenser. At least one portion of said cooling liquid is thereby recovered as vapours. Further, vapours are recovered by subjecting a liquid withdrawn from said stripping column to pressure reduction to at most approximately atmospheric pressure to generate vapours from the withdrawn liquid.
70 to 90% of steam consumed in the stripping column when operated under atmospheric pressure can be thereby recovered.

---

Figure 1:
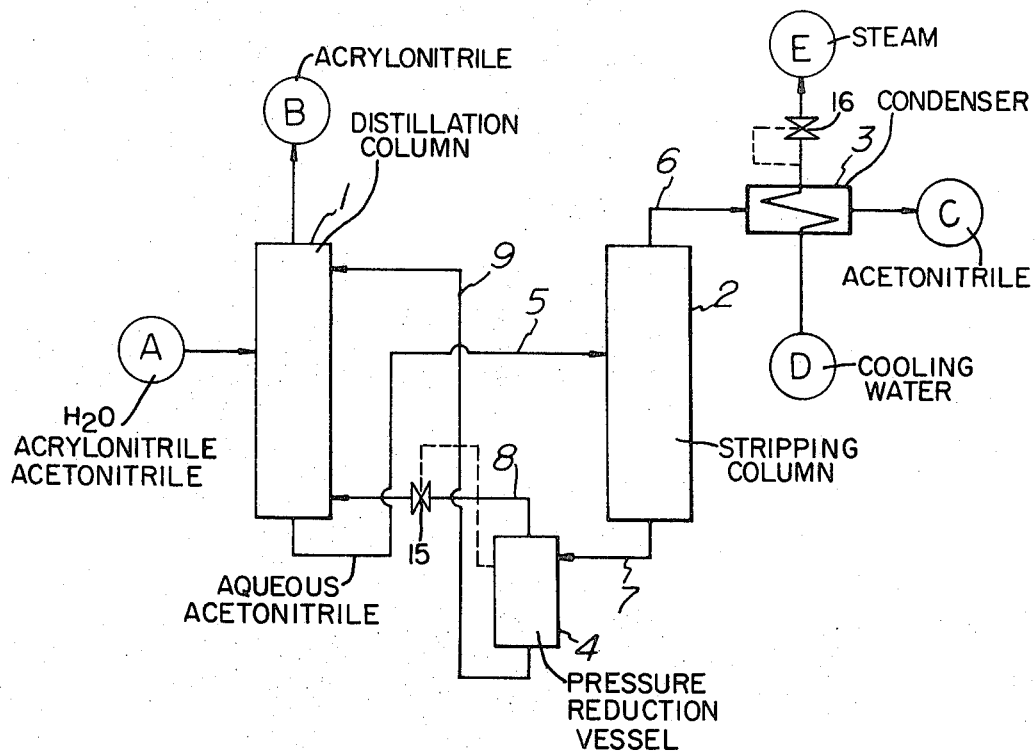

The present invention relates to a method for separating and recovering acrylonitrile and acetonitrile individually from a mixture containing acrylonitrile and acetonitrile, and more particularly to a method for separating and recovering acrylonitrile and acetonitrile with an improvement in steam consumption.

Acetonitrile is simultaneously produced in some cases when acrylonitrile is produced. For example, in case acrylonitrile is produced by gaseous phase, catalytic ammoxidation of propylene or acrolein, a gaseous mixture containing acrylonitrile and acetonitrile is obtained, and then an aqueous solution containing acrylonitrile and acetonitrile is obtained by absorbing said mixture into water. It is noted that such a by-product as hydrogen cyanide is also contained in said aqueous solution. Since acetonitrile is one of the impurities which are hard to remove, a number of processes have been proposed to purify crude acrylonitrile containing acetonitrile or, in other words, to obtain acetonitrile free from acrylonitrile. The proposed processes include a process for separating acrylonitrile and acetonitrile from the aqueous solution containing acrylonitrile and acetonitrile by an extractive distillation using water as an extracting agent. According to said process, acrylonitrile is obtained from the top of an extractive distillation column, and water containing acetonitrile is obtained from the lower section of said column. Accordingly, when the aqueous solution containing acetonitrile, which is obtained from the lower section of said extractive distillation column, is subjected to steam stripping by injecting steam, into the aqueous solution in a stripping column having a recovery section, acetonitrile is recovered from the top of the stripping column as an azeotropic mixture with water.

The present invention relates to an improvement in said prior art process.

In case an aqueous solution containing acrylonitrile and acetonitrile is subjected to extractive distillation using water as an extracting agent, a considerable amount of water must be added to the extractive distillation column to enhance a separation efficiency of acetonitrile. Thus, when the aqueous solution obtained from the lower section of the extractive distillation column is subjected to stripping, a considerable amount of water containing a very small amount of acetonitrile is recovered from the bottom of the stripping column, and at the same time water rich in acetonitrile is distilled off from the top of the stripping column. Overhead vapours from the top of the stripping column by the distillation are not acetonitrile alone, because acetonitrile distills off azeotropically together with water. The overhead vapours evolved from the top of the stripping column are usually cooled in a condenser using water as a cooling medium, and an aqueous acetonitrile solution is thereby obtained. In the conventional process, heat energy of said overhead vapours is discarded without recovery. In other words, the cooling water used in said condenser is changed only to hot water, and such hot water has no special uses. In the conventional process, not only a large amount of steam is consumed as a heat source for operating the extractive distillation column and stripping column, because a considerable amount of water must be dealed with in the process, but also there is a problem in heat energy recovery. Thus, the conventional process has never satisfied the heat economy.

The object of the present invention is to improve an overall process heat economy by effectively utilizing a large amount of heat energy discarded by said cooling water and recovering the cooling water of said condenser of the stripping column as vapours.

The present invention is to provide an improved process for separating acrylonitrile and acetonitrile which comprises feeding an aqueous solution containing acrylonitrile and acetonitrile to an upper half section of an extractive distillation column using water as an extracting agent, recovering acrylonitrile as overhead vapours from the top of said distillation column, feeding a liquid withdrawn from the lower section of said extractive distillation column to an upper half section of a stripping column, and condensing overhead vapours from the top of said stripping column thereby to recover acetonitrile, wherein an improvement comprises condensing at least one portion of overhead vapours evolved from the top of said stripping column in a condenser at a temperature high enough to allow the condensation of said vapours to boil a cooling liquor in a condenser by operating the distillation in said stripping column under pressure, thereby recovering at least one portion of said cooling liquor as vapours, and subjecting a liquid withdrawn from said stripping column to pressure reduction to at most approximately atmospheric pressure, and thereby generating and recovering vapours from the withdrawn liquid.

The relation between the stripping column and the condenser of the present invention corresponds to a relation between the multiple effect evaporators, especially double effect evaporators, with respect to the generation of other vapours by the latent heat of condensation of the overhead vapours. Usually, the temperature difference between the top and the bottom of the stripping column is far greater than the temperature in one evaporator of multiple effect evaporators, because in the stripping column the temperature difference depends mainly on a difference in concentration of low boiling substance between the top and the bottom of the stripping column, whereas in the multiple effect evaporators the temperature difference depends upon rise rise in boiling point of the solution. Accordingly, the condensing temperature of overhead vapours evolved from the top of the stripping column is so low that it is difficult to use the stripping column as a kind of the multiple effect evaporators by effectively generating vapours from the condenser attached to the stripping column. However, in the present invention such a function as of multiple effect evaporators is skillfully adopted by slightly increasing the pressure of the stripping column utilizing the fact that the overhead vapours evolved from the top of the stripping column contain a relatively large amount of water which is a high boiling point substance and consequently the temperature difference is only about 6 to 10° C. between the top and the bottom of the stripping column.

According to the present invention, the distilling operation of the stripping column is carried out under pressure, that is, a pressure of several kilograms/cm.$^2$ gauge. That is to say, it is preferable that the column top pressure ranges from about 0.5 to about 5.0 kg./cm.$^2$ gauge. Usually, a sufficient effect can be obtained under a column top pressure ranging from about 0.6 to about 3.0 kg./cm.$^2$ gauge.

The ordinary cooling water or boiler feed water is applicable in the present invention as a cooling liquor for the condenser where at least one portion of the overhead vapours evolved from the top of the stripping column is condensed (the condenser will be hereinafter referred to as "condenser"). However, for this purpose, the liquid withdrawn from the lower section of the extractive distillation column can also be used as a cooling liquor. Unless use of the generated vapours containing acetonitrile from the condenser is objectionable. Further, the liquor that has a higher temperature than that of the material to be cooled, such as the liquid withdrawn from the concentration section, recovery section or bottom of the stripping column, can be used in the condenser to cool the overhead vapours evolved from the top of the stripping column.

In case a cooling liquor having a lower temperature than that of the material to be cooled is used, the pressure of the material to be cooled is elevated higher than the pressure of the heat-receiving side of the condenser by operating the stripping column under pressure, and thus at least a portion of the cooling liquor itself is evaporated as vapours, while it cools the material to be cooled.

On the other hand, even in case of using the cooling liquor having a higher temperature than that of the material to be cooled, the stripping column is operated under pressure and the pressure at the heat-receiving side of the condenser, that is, the cooling liquor side, is made lower so that the temperature of cooling liquor at the heat-receiving side of the condenser may be lower than the column top temperature of the stripping column, whereby a portion of the cooling liquor evaporates as vapours and as a result the temperature of the cooling liquid is lowered and at the same time the material to be cooled is cooled.

In this case, a relation between the temperature of the material to be cooled and the corresponding temperature at the heat-receiving side of the condenser is not essentially different from the relation observed in case of using the cooling liquor having a lower temperature than that of the material to be cooled. In case, for example, steam of 110° C. is generated by feeding cooling water of 30° C. to the heat-receiving side of the condenser, it is not the temperature of 30° C. but principally the aqueous phase temperature of 110° C. in an equilibrium state with the generated steam that causes the condensation of the material to be cooled. Further, even in case, for example, the vapour of 110° C. is generated by feeding a liquid withdrawn from the stripping column at 130° C. to the heat-receiving side of the condenser and reducing the pressure of the liquor in the condenser, it is the liquid phase temperature of 110° C. in an equilibrium state with the generated vapour that causes the condensation of the material to be cooled.

According to the present invention, it is intended to generate vapours from the liquid withdrawn from the stripping column, that is, the liquid withdrawn from the lower part, preferably bottom part of the stripping column, by reducing the pressure of the liquid to at most approximately atmospheric pressure and thereby recover the heat energy of the liquid withdrawn from the stripping column. In particular cases, substantially all amount of the liquid withdrawn from the recovery section or the bottom of the stripping column is fed to the heat-receiving side of the condenser. In that case, substantially all the amount of the liquid withdrawn from the stripping column is subjected to pressure reduction in the condenser and thus the vapours are likewise generated from the liquid withdrawn from the stripping column by the pressure reduction. Thus, the same principle of generating vapours by pressure reduction is applied even to that case.

As stated above, the temperature of the liquid withdrawn from the lower section of the stripping column is higher than the temperature in the case of the atmospheric operation, and accordingly, the amount of heat carried away by said withdrawn liquid from the stripping column is increased by its sensible heat increment. Thus, a portion of steam fed for operating the stripping column is consumed to compensate said sensible heat increment, and as a result, in some cases a larger amount of steam must be fed than in the case of the atmospheric operation to maintain the same stripping effect as in the atmospheric operation. The amount of steam to be fed to the stripping column depends upon the concentration of acetonitrile in the solution fed to the stripping column, the degree of the pressure applied to the stripping column, and other conditions. As a counter-measure for such a high consumption of steam, the sensible heat of the withdrawn liquid must be effectively utilized, even though substantially excess steam is not required. Thus, in the present invention, a portion of said sensible heat is to be recovered as vapours by reducing the pressure of the withdrawn liquid to at most approximately atmospheric pressure. In that case, the degree of pressure reduction is arbitrarily selected so that the recovered steam may suit the conditions required by the steam user, but generally the limit of the pressure reduction is down to approximately atmospheric pressure. It is particularly preferable to reduce the pressure of the liquid down to the pressure of the lower section, preferably, to the pressure of the bottom of the extractive distillation column. Since the pressure of the lower section of the extractive distillation column is almost equal to the pressure of the lower section of the stripping column in the case of the atmospheric operation, the temperature of the liquid after the pressure reduction becomes almost equal to the temperature of the liquid withdrawn from the lower section of the stripping column in the case of atmospheric operation. Accordingly, the sensible heat increment of the liquid withdrawn from the lower section of the stripping column in the case of said operation under pressure is almost offset by the amount of vapours generated by said pressure-reducing operation. For example, even in the case the steam to be consumed in the stripping column is increased by an amount equal to the sensible heat increment of the liquid withdrawn from the lower section of the stripping column, the increment in the amount of steam to be consumed is compensated by the vapours generated by the pressure reduction of the liquid withdrawn from the lower section of the stripping column, and thus the vapours generated in the condenser are a gain.

In the present invention, the pressure reduction of the liquid withdrawn from the lower section of the stripping column is usually carried out in a pressure reduction vessel. In the case the liquid withdrawn from the concentration section, recovery section or the bottom of the stripping column is fed to the heat-receiving side of the condenser, the pressure reduction is carried out in the pressure reduction vessel, and at the heat-receiving side of the condenser. In a particular case, almost all the liquid withdrawn from the recovery section or the bottom of the stripping column is fed to the heat-receiving side of the condenser. In that case, almost all the withdrawn liquid is pressure-reduced at the heat-receiving side of the condenser, and as a result, the sensible heat increment is almost recovered in the condenser. Accordingly, it is not necessary to provide a pressure reduction vessel especially for recovering the sensible heat increment, and a small amount of remaining liquid which is not to be fed to the condenser can be thrown away. That is to say, the special provision of the pressure reduction vessel depends upon effective utilization of the sensible heat of the withdrawn liquid.

The vapours generated in the pressure reduction vessel can be used, unless the presence of a very small amount of acetonitrile contained in the vapours is objectionable, but usually the vapours generated in the pressure reduction vessel are preferably used as a heat source for the extractive distillation column by making the pressure of the pressure reduction vessel almost equal to the bottom pressure of the extractive distillation column.

The unevaporated residual liquid from the pressure reduction vessel can be of course used, unless the presence of a very small amount of acetonitrile contained in the liquid is objectionable, but such residual liquid is preferably used as an extracting agent in the extractive distillation column or as an absorbent liquid for a gaseous mixture of acrylonitrile and acetonitrile.

The cooling liquor for the condenser can be fed to the heat-receiving side of the condenser in any manner. When the boiler feedwater is used as a cooling liquor, it is generally preferable to feed feedwater to the heat-receiving side of the condenser in an amount corresponding to the amount of steam to be evaporated at the heat-receiving side of the condenser. However, when the liquid withdrawn from the lower section of the extraction distillation column or the liquid withdrawn from the stripping column, that is, the liquid withdrawn from the concentration section, recovery section, or the bottom of the stripping column, is used as a cooling liquor, it is preferable to feed the liquid to the heat-receiving side of the condenser in an amount more than the amount of vapours to be generated at the heat-receiving side of the condenser, because non-volatile impurities are contained in the liquid and thus there is such a possibility that various troubles would be brought about when all the amount of cooling liquor is evaporated at the heat-receiving side of the condenser. However, non-volatile impurities are not involved substantially in the liquid withdrawn from the concentration section of the stripping column, and thus it is possible to feed the cooling liquor, when the liquid withdrawn from the concentration section of the stripping column is used as a cooling liquor, to the heat-receiving side of the condenser in an amount corresponding to the amount of vapours to be generated at the heat-receiving side of the condenser. The vapours generated at the heat-receiving side of the condenser and unevaporated liquid are supplied to the respective necessary users. One of users of the vapours generated at the heat-receiving side of the condenser is a heat source for the extractive distillation column. In that case, the pressure at the heat-receiving side is approximately equal to the bottom pressure of the extractive distillation column. The unevaporated liquid at the heat-receiving side of the condenser will have different end uses, depending upon the composition of the unevaporated liquid. That is, when the boiler feedwater is used as a cooling liquor for the condenser, and of course when only a portion of the feedwater is evaporated at the heat-receiving side, the unevaporated water can be used at any users. When the liquid withdrawn from the bottom of the stripping column is used as a cooling liquor for the condenser, it is preferable to use the unevaporated liquid as an extracting agent in the extractive distillation column or as in absorbent liquor for a gaseous mixture containing acrylonitrile and acetonitrile.

Further, when the liquid withdrawn from the lower section of the extractive distillation column or the liquid withdrawn from the concentration section of the stripping column is used as a cooling liquor, it is preferable to feed the unevaporated liquid to the upper half section of the stripping column or lower half section of the extractive distillation column. When the liquid withdrawn from the recovery section of the stripping column is used as a cooling liquor, it is preferable to return the unevaporated liquid, to the recovery section of the stripping column.

In case a liquid from the lower section of the extractive distillation column is used as a cooling liquor, and vapours generated at the heat-receiving side of the condenser and unevaporated liquid are fed to the lower section of the extractive distillation column, it is preferable to use a reboiler-type condenser.

When the liquid withdrawn from the lower section of the extractive distillation column or the liquid withdrawn from the stripping column is used as a cooling liquor, the liquid can be used together with the boiler feedwater.

When the liquid withdrawn from the stripping column is used as a cooling liquor for the condenser, the temperature of the cooling liquor to be fed to the heat-receiving side of the condenser is higher than the temperature of vapours to be generated therein. In that case, the vapours are generated at the heat-receiving side in an amount more than the amount of the heat of condensation of the overhead vapours evolved from the top of the stripping column when the overhead vapours are condensed in the condenser. That is, the vapours are generated at the heat-receiving side also by the pressure reduction. The liquor withdrawn from the condenser, that is, the unevaporated liquid has a temperature lower than the temperature which the liquid has before the pressure reduction in the condenser, and thus it is necessary, when the liquor is to be returned to the stripping column, to heat the liquor to some degree to elevate the temperature. However, the amount of vapour to be consumed to heat the liquor is not more than the amount of vapours generated only by the pressure reduction in the condenser, and is usually less than the amount of vapours generated. When the liquor is not returned to the stripping column, the amount of vapours to be used for such heating will be a gain.

The present invention will be concretely explained hereunder, referring to the accompanying drawings.

FIGS. 1 to 4 are basic flow diagrams of examples showing preferable embodiments of the present invention, and accordingly, for example, a steam feed main pipe to the extractive distillation column, a discharge pipe for maintaining water balance, and other equipment to be provided when required are omitted from the drawings to facilitate understanding of the principle of the present invention.

Raw material, A, used in the present invention is a solution containing acrylonitrile and acetonitrile. For example, the raw material includes an aqueous solution obtained by removing ammonia from gases formed through a catalytic reaction of a gaseous mixture consisting of propylene, ammonia, and oxygen, that is, gases formed through the so-called ammoxidation of propylene, and absorbing the ammonia-free gases with water. So long as an aqueous solution contains acrylonitrile and acetonitrile together, the aqueous solution that has been subjected to a distillation step before treating the solution according to the present invention may be used in the present invention as a raw material.

FIG. 1 shows one embodiment where boiler feedwater is used as cooling water for a condenser.

Raw material A is fed to the upper half section of an extractive distillation column 1, and water is added from the top of column 1. Extractive distillation is carried out in the column 1, and acrylonitrile substantially free from acetonitrile is obtained from the top of column 1 as overhead vapours.

An aqueous solution containing acetonitrile is withdrawn from the lower section, preferably the bottom of the extractive distillation column 1 and is fed to a stripping column 2 through a pipe 5. The aqueous solution is distilled under pressure in the stripping column 2. Any procedure can be employed for operating the stripping column under pressure. One procedure is to apply pressure to the stripping column by use of nitrogen gas.

Overhead vapours evolved from the top of stripping column 2 are led to a condenser 3 through a pipe 6, and at least a portion of the overhead vapours is condensed in the condenser, whereby acetonitrile C is recovered. As stated above, acetonitrile is obtained in a state as a mixture with water. Acetonitrile is recovered as a mixture by further cooling or as pure acetonitrile by further purification. The condenser may be a partial condenser or total condenser, and a condenser having any desired structure can be used so long as the condenser satisfies the desired object. For example, a shell-and-tube type heat exchanger having a sufficient heat transfer area can be used, and cooling water D, a boiler feedwater, is continuously supplied to the heat-receiving side of the condenser, and discharged therefrom, if required. In that case, it is preferable to keep the cooling water in the condenser at a constant level. Generated steam E may be fed to the bottom of the extractive distillation column 1 as a heat source for the extractive distilation by direct injection of generated live steam, or may be supplied to other suitable users directly or after pressure elevation by a steam ejector.

When the stripping column 2 is operated at a smaller reflux ratio so that an acetonitrile concentration may be lowered at the top of the stripping column 2, water content of the overhead vapours increases, because water is a higher boiling point compound, and consequently the condensation temperature of the overhead vapours is elevated. Thus, an operation based on such a lower acetonitrile concentration at the top of the stripping column is advantageous for generating steam.

An aqueous solution withdrawn from the lower section preferably the bottom of the stripping column 2 is led to a pressure reduction vessel 4 through a pipe 7, and a portion of the aqueous solution is converted to vapours.

In the preferable mode of the present invention, the vapours generated in the pressure reduction vessel 4 are fed to the bottom of the extractive distillation column 1 through a pipe 8, and are used therein as a heat source for the extractive distillation, as shown in FIG. 1, and the liquid withdrawn from the pressure reduction vessel 4 is fed to the upper section of the extractive distillation column 1 through a pipe 9, and used therein as an extracting agent for the extractive distillation. By so doing, said liquor and/or a very small amount of acetonitrile contained in the vapours can be effectively recovered, and at the same time a water balance throughout the entire process becomes favourable. As stated above, the liquid withdrawn from the pressure reduction vessel 4 can be, of course, used as an absorbent liquor for the gaseous mixture containing acrylonitrile and acetonitrile and being obtained by the ammoxidation of propylene. Numerals 15 and 16 indicate pressure control valves.

In a preferable mode of operation where the liquid withdrawn from the lower section, preferably the bottom of the extractive distillation column is used as a cooling liquor for the condenser, the vapours generated at the heat-receiving side of the condenser are used as a heat source for the extractive distillation column, and the unevaporated liquor at the heat-receiving side of the condenser is supplied to the upper half section of the stripping column. Only these points are different from the embodiment shown in FIG. 1.

Figure 2:
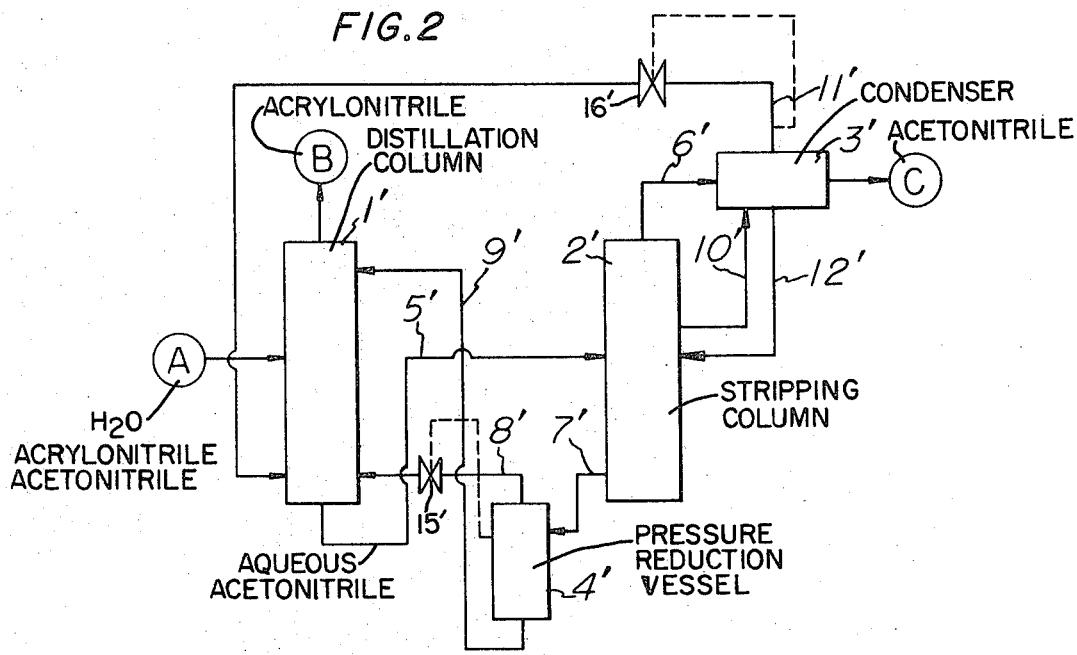

FIG. 2 shows another preferable embodiment of the present invention, where a liquid withdrawn from the concentration section of the stripping column is used as a cooling liquor for a condenser. The liquid withdrawn from the concentration section of the stripping column 2' is fed to the heat-receiving side of a condenser 3' through a pipe 10'. As in the case shown in FIG. 1, the heat-receiving side of the condenser 3' is lower in pressure than the stripping column 2'. In that case, the pressure of the heat-receiving side is almost equal to the bottom pressure of the extractive distillation column. Thus, the liquid withdrawn from the concentration section of the stripping column is partially converted to vapours by flashing, when fed to the condenser 3', and the temperature of the residual liquid is thereby lowered, and the lowered temperature functions as the temperature of the heat-receiving side in the condenser 3'. Heat is exchanged between the thus temperature-lowered liquor and the overhead vapours evolved from the stripping column, and further portion of the liquor is thereby evaporated. The vapours generated by the flashing and heat exchange are fed to the bottom of the extractive distillation column 1' through a pipe 11', and used therein as a heat source for the extractive distillation. Unevaporated liquor at the heat-receiving side of the condenser 3' is fed to the upper half section of the stripping column 2' through a pipe 12'. In that case, the liquid must be withdrawn from a position of the stripping column that allows the acetonitrile concentration of the vapours generated from the condenser, that is, the vapours in the pipe 11', not to exceed the acetonitrile concentration of overhead vapours from the stripping column. Numerals 15' and 16' indicate pressure control valves.

When the liquid is withdrawn from the recovery section of the stripping column and used as a cooling liquor for the condenser, it is preferable to return the unevaporated liquor obtained at the heat-receiving side of the condenser to the recovery section of the stripping column. When the liquid is withdrawn from the bottom of the stripping column and is used as a cooling liquor for the condenser, it is preferable to use the unevaporated liquor obtained at the heat-receiving side of the condenser as an extracting agent for the extractive distillation and/or an absorbent liquid for a gaseous mixture containing acrylonitrile and acetonitrile.

Figure 3:
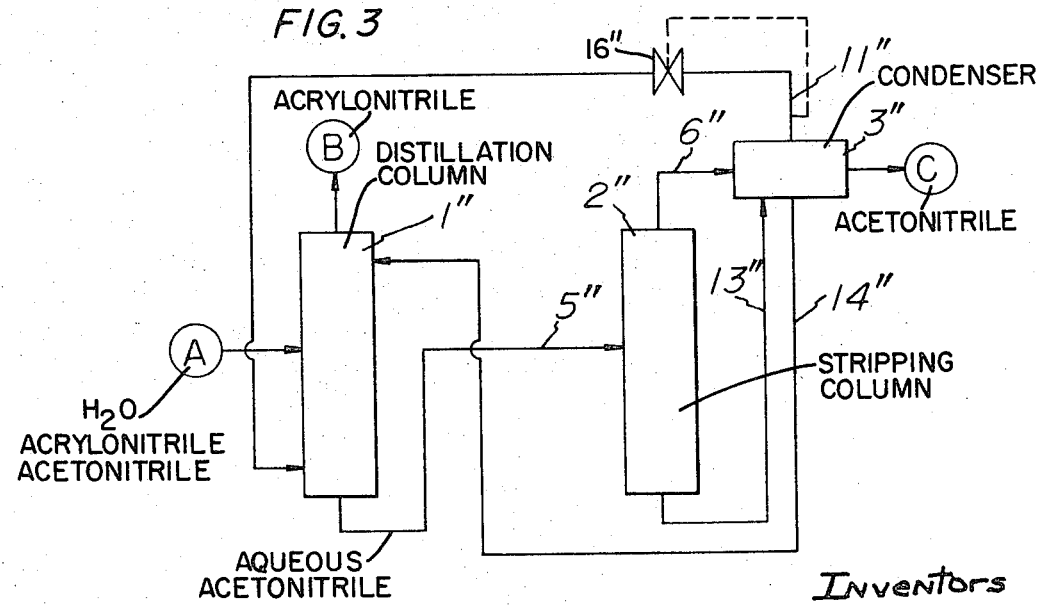

FIG. 3 shows another preferable embodiment of the present invention, where a liquid is withdrawn from the bottom of the stripping column and used as a cooling liquor for the condenser without passing the liquid through any pressure reduction vessel, that is, the pressure reduction of the liquid withdrawn from the stripping column is entirely carried out in the condenser.

A liquid is withdrawn from the recovery section of a stripping column 2" and fed to the heat-receiving side of a condenser 3". As in FIG. 2, the withdrawn liquid is partially converted to vapours by flashing and heat exchange at the heat-receiving side of the condenser 3". The generated vapours are fed to the bottom of an extractive distillation column 1" through a pipe 11" and used therein as a heat source for the extractive distillation. The unevaporated liquid obtained at the heat-receiving side of the condenser 3" is fed to the upper section of an extractive distillation column 1" through a pipe 14", and/or to the top of an absorption column (not shown in the drawing) for absorbing a gaseous mixture containing acrylonitrile and acetonitrile, and is used therein as an extracting agent for the extractive distillation and/or as an absorbent liquid respectively. Numeral 16" indicates a pressure control valve.

Figure 4:
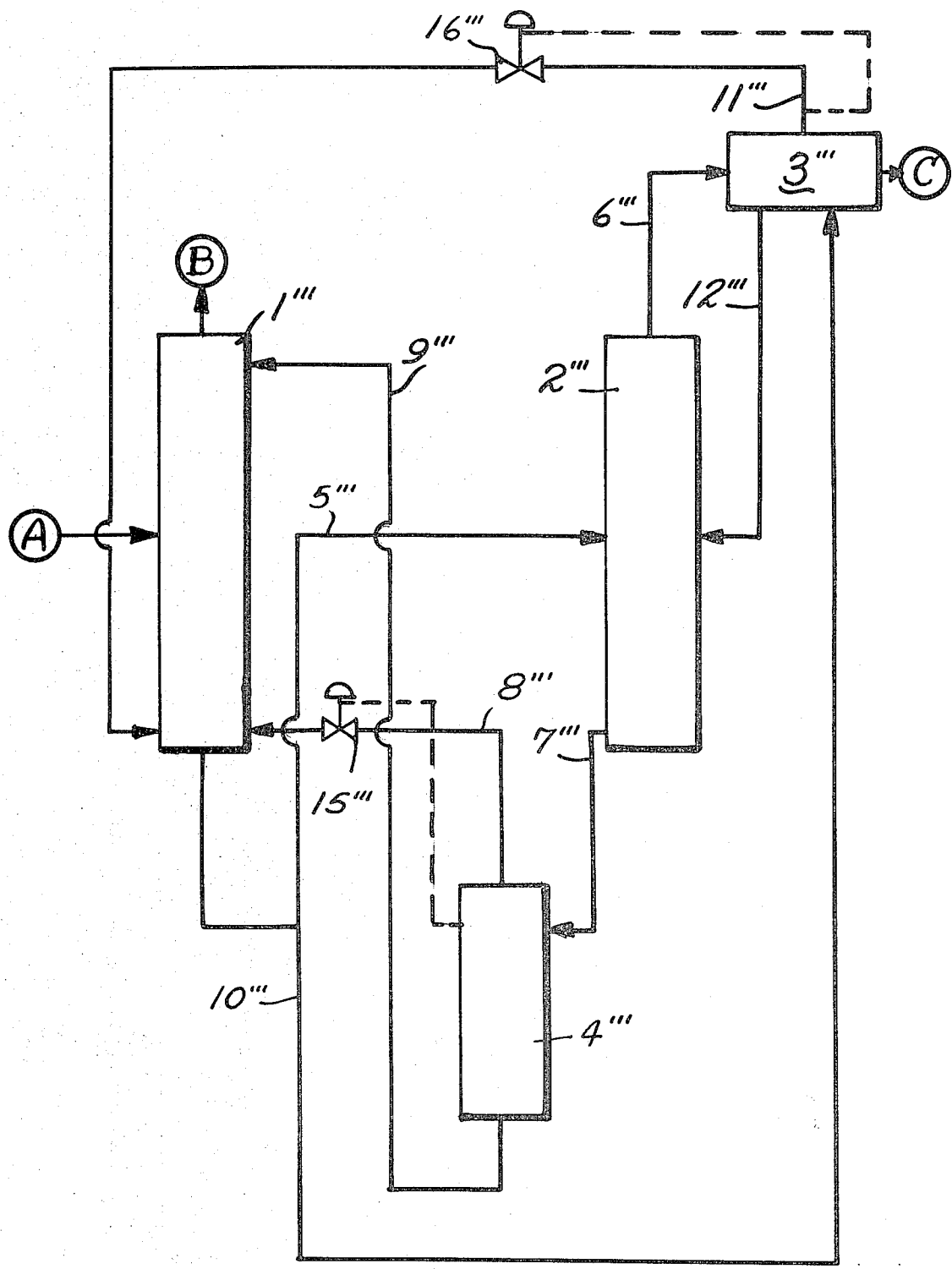

In a preferable mode of operation for the case that the liquid is withdrawn from the recovery section of the stripping column through a pipe 13 and used as a cooling liquor for the condenser without using any pressure reduction vessel, the same flowscheme is used as in FIG. 3, except that the liquid is withdrawn only from the different position of the stripping column. FIG. 4 shows an embodiment wherein liquid withdrawn from the lower section of the extractive distillation columns is used as the cooling liquid for a condenser. The liquid withdrawn from the bottom of the extractive distillation column 1''' is fed to the heating-receiving side of condenser 3''' through a pipe 10'''. Only these points are different from the embodiment shown in FIG. 2.

Several embodiments of the present invention as well as possible modifications have been explained in the foregoing sections, but it goes without saying that any other modification is still possible on the basis of the principle of the present invention without any inconsistency with the principle of the present invention. For example, U.S. Pat. No. 3,352,764 discloses that a liquid is withdrawn from the recovery section of a stripping column and used as an absorbent liquid for a gaseous mixture of acrylonitrile and acetonitrile. If the withdrawn liquid is fed to the heat-receiving side of the condenser in said U.S. patent, the sensible heat of the liquid can be effectively utilized without using any special pressure reduction vessel for the withdrawn liquid, and further there is such an advantage that the acetonitrile concentration of the liquid withdrawn from the condenser is lower than that of the liquid withdrawn from the stripping column, when the withdrawn liquid is used as an absorbent liquid for the absorption column for absorbing a gaseous mixture of acrylonitrile and acetonitrile.

In these possible modifications of the present invention, necessity for installing individual pressure reduction vessels for each of a plurality of withdrawn liquids depends entirely upon the economics of sensible heat utilization of the liquid withdrawn from the stripping column, and it is not always necessary to install individual pressure reduction vessels for each of a plurality of the withdrawn liquids.

The present invention is further explained concretely, referring to examples:

EXAMPLE 1

An aqueous solution containing acrylonitrile and acetonitrile, which was obtained by removing ammonia from a gaseous mixture formed through ammoxidation of propylene for the main purpose of obtaining acrylonitrile, and subjecting the gaseous mixture to absorption with water, was treated in a separation apparatus consisting of an extractive distillation column for recovery of acrylonitrile and a stripping column for recovery of acetonitrile. A condenser for vapour generation, which was shell-and-tube type heat exchanger, was installed in series at the upstream side of a total condenser for the stripping column. Pressure of the stripping column was increasingly elevated by applying a pressure to the stripping column from the total condenser side using nitrogen gas, while steam was injected in an increasing amount into the stripping column, and finally the stripping column top pressure was set to 1.2 kg./cm.$^2$ gauge. The amount of steam consumed in the stripping column was increased by 32.4%, as compared with that at the atmospheric operation. Under that condition, steam was generated at the jacket side of the condenser in an amount corresponding to 75.0% of that consumed at the atmospheric operation of the stripping column. The jacket side pressure of the condenser was 0.35 kg./cm.$^2$ gauge at that time.

On the other hand, the bottom liquid was withdrawn from the stripping column so that the liquid level may be kept constant at the bottom of the stripping column and led to a pressure reduction vessel, whose gaseous phase section was connected to the bottom of the extractive distillation column. The liquid was further withdrawn from the bottom of the pressure reduction vessel so that the liquid level of the pressure reduction vessel may be constant, and used as an extracting agent in the extractive distillation column. Since the steam generated in the pressure reduction vessel was supplied to the extractive distillation column, the amount of steam fed to the extractive distillation column was reduced to 71.3% of the amount of steam supplied when the stripping column was operated under the atmospheric pressure. Accordingly, it was confirmed that 28.7% of the amount of steam to be consumed in the extractive distillation column was generated in the pressure reduction vessel. Such amount corresponded to 31.3% of the amount of steam consumed in the stripping column when operated under the atmospheric pressure, and was approximately balanced with an increment of steam consumed in the stripping column when operated under pressure. In that case, the inside pressure of the pressure reduction vessel was 0.60 kg./cm.$^2$ gauge and the temperature of the liquid withdrawn from the bottom of the extractive distillation column was 130° C. The stripping column was operated so that the acetonitrile concentration of the overhead vapours of the stripping column may be about 20%.

EXAMPLE 2

In the apparatus of Example 1, a liquid-withdrawing outlet was provided in the stripping column on a stage higher than the feeding stage by one stage, that is, the stage having an inlet for a liquid withdrawn from the lower section of the extractive distillation column, and said liquid-withdrawing outlet was connected to the heat-receiving side, that is, jacket side of the condenser installed at the upstream side of the total condenser for the stripping column. The liquid withdrawn from the concentration section of the stripping column was fed to the condenser. Unevaporated liquid at the jacket side of the condenser was returned to the feeding stage of the stripping column. Inside pressure of the stripping column was increasingly elevated by applying a pressure to the stripping column from the total condenser side using a nitrogen gas, while steam was injected in an increasing amount into the stripping column. Finally, the top pressure of the stripping column was set to 1.2 kg./cm.$^2$ gauge. The amount of steam consumed was thereby increased by 20.0%, as compared with that when the stripping column was operated under atmospheric pressure. Under such conditions, steam was generated at the jacket side of the condenser in an amount corresponding to 80.0% of the amount of steam consumed in the stripping column when operated under atmospheric pressure. The jacket side pressure of the condenser was 0.35 kg./cm.$^2$ gauge at that time.

On the other hand, the liquid was withdrawn from the bottom of the stripping column so that the liquid level may be kept constant at the bottom of the stripping column, and fed to a pressure reduction vessel. Then, the liquid was further withdrawn from the bottom of the pressure reduction vessel so that the liquid level of the pressure reduction vessel may be kept constant and used as an extracting agent in the extractive distillation column. Steam generated in the pressure reduction vessel was supplied to the extractive distillation column and consequently the amount of steam supplied to the extractive distillation column was reduced to 71.3%. It was confirmed that steam was generated in the pressure reduction vessel in an amount corresponding to 28.7% of the amount of steam consumed in the extractive distillation column. Such amount corresponded to 31.3% of the amount of steam consumed in the stripping column when operated under atmospheric pressure, and thus steam was recovered in an amount corresponding to 91.3% of the amount of steam consumed in the stripping column when operated under the atmospheric pressure, as a balance. The pressure of the pressure reduction vessel was 0.6 kg./cm.$^2$ gauge at that time, and the temperature of the liquid withdrawn from the bottom of the stripping column was 130° C. Operation was carried out so that the acetonitrile concentration of overhead vapours of the stripping column may be about 20%.

EXAMPLE 3

In an apparatus of Example 2, the liquid was withdrawn from the bottom of the stripping column and directly fed to the jacket side of the condenser without using any pressure reduction vessel, and the unevaporated liquid obtained at the jacket side of the condenser was used as an extracting agent in the extractive distillation column. Steam consumption was increased by 16.2%, steam was generated by 110.2% and 94.0% of steam was recovered by the pressure operation of the stripping column, as compared with the atmospheric operation of the same.

EXAMPLE 4

The same apparatus as used in Example 1 was used, and boiler feedwater was supplied to the jacket side of the vapour-generating condenser for the stripping column. The pressure was set to 1.6 kg./cm.$^2$ gauge at the top of the stripping column.

In that case, steam consumption of the stripping column was increased by 43.2%, as compared that when the stripping column was operated under the atmospheric pressure. Under that condition, steam was generated at the condenser jacket side in an amount corresponding to 95% of the amount of steam consumed in the stripping column under the atmospheric operation. The condenser jacket side pressure was 0.40 kg./cm.$^2$ gauge at that time.

On the other hand, the liquid was withdrawn from the bottom of the stripping column as in Example 1, and led to the pressure reduction vessel. The vapours generated from the gaseous phase section of the pressure reduction vessel were led to the bottom of the extractive distillation column, and the liquid withdrawn from the pressure reduction vessel was used as an extracting agent in the extractive distillation column.

Steam consumption of the extractive distillation column was reduced to 63.1% and it was thus confirmed that steam was generated in the pressure reduction vessel in an amount corresponding to 36.9% of the amount of steam consumed in the extractive distillation column.

Such amount corresponded to 40.3 of the amount of steam consumed in the stripping column in atmospheric operation, and was almost balanced with the increment of steam consumed in the stripping column in pressure operation. The pressure of the pressure reduction vessel was 0.60 kg./cm.$^2$ gauge, and the temperature of the liquid withdrawn from the bottom of the extractive distillation column was 134° C. at that time. Operation was carried out so that the acetonitrile concentration of overhead vapours of the stripping column may be 20%.

We claim:

1. In a method for separating acrylonitrile and acetonitrile which comprises feeding an aqueous solution containing acrylonitrile and acetonitrile to an upper half section of an extractive distillation column using water as an extracting agent, recovering acrylonitrile as overhead vapours from the top of said distillation column, feeding a liquid withdrawn from the lower section of said extractive distillation column to an upper half section of a stripping column, and condensing overhead vapours from the top of said stripping column thereby to recover acetonitrile, the improvement comprising condensing at least one portion of overhead vapours evolved from the top of said stripping column in a condenser at a temperature high enough to allow the condensation of said vapours to boil a cooling liquor in a condenser by operating the distillation in said stripping column under pressure, thereby recovering at least one portion of said cooling liquor as vapours, and subjecting a liquid withdrawn from said stripping column to pressure reduction to no more than approximately atmospheric pressure, and thereby generating and recovering vapours from the withdrawn liquid, said cooling liquid being a liquid withdrawn from the lower section of said extractive distillation column.

2. In a method for separating acrylonitrile and acetonitrile which comprises feeding an aqueous solution containing acrylonitrile and acetonitrile to an upper half section of an extractive distillation column using water as an extracting agent, recovering acrylonitrile as overhead vapours from the top of said distillation column, feeding a liquid withdrawn from the lower section of said extractive distillation column to an upper half section of a stripping column, and condensing overhead vapours from the top of said stripping column thereby to recover acetonitrile, the improvement comprising condensing at least one portion of overhead vapours evolved from the top of said stripping column in a condenser at a temperature high enough to allow the condensation of said vapours to boil a cooling liquor in a condenser by operating the distillation in said stripping column under pressure, thereby recovering at least one portion of said cooling liquor as vapours, and subjecting a liquid withdrawn from said stripping column to pressure reduction to no more than approximately atmospheric pressure, and thereby generating and recovering vapours from the withdrawn liquid, said stripping column having a concentration section in the upper portion above the feeding stage thereof, said cooling liquid being a liquid withdrawn from said concentration section and said cooling liquid is pressure-reduced at the heat-receiving side of said condenser down to a pressure under which a temperature of said liquid at the heat-receiving side of said condenser is lower than a temperature at the top of said stripping column.

3. In a method for separating acrylonitrile and acetonitrile which comprises feeding an aqueous solution containing acrylonitrile and acetonitrile to an upper half section of an extractive distillation column using water as an extracting agent, recovering acrylonitrile as overhead vapours from the top of said distillation column, feeding a liquid withdrawn from the lower section of said extractive distillation column to an upper half section of a stripping column, and condensing overhead vapours from the top of said stripping column thereby to recover acetonitrile, the improvement comprising condensing at least one portion of overhead vapours evolved from the top of said stripping column in a condenser at a temperature high enough to allow the condensation of said vapours to boil a cooling liquor in a condenser by operating the distillation in said stripping column under pressure, thereby recovering at least one portion of said cooling liquor as vapours, and subjecting a liquid withdrawn from said stripping column to pressure reduction to no more than approximately atmospheric pressure, and thereby generating and recovering vapours from the withdrawn liquid, said stripping column having a recovery section in the lower portion below the feeding stage thereof, said cooling liquid is pressure-reduced at the heat-receiving side of said condenser down to a pressure under which a temperature of said liquid at the heat-receiving side of said condenser is lower than a temperature at the top of said stripping column.

4. A method according to claim 3 wherein said cooling liquid is withdrawn from the bottom of said stripping column.

5. In a method for separating acrylonitrile and acetonitrile which comprises feeding an aqueous solution containing acrylonitrile and acetonitrile to an upper half section of an extractive distillation column using water as an extracting agent, recovering acrylonitrile as overhead vapours from the top of said distillation column, feeding a liquid withdrawn from the lower section of said extractive distillation column to an upper half section of a stripping column, and condensing overhead vapours from the top of said stripping column thereby to recover acetonitrile, the improvement comprising conducting distillation operation under a top pressure of about 0.6 to about 3.0 kg./cm.$^2$ gauge in said stripping column, evaporating at least one portion of a cooling liquor for a condenser for condensing at least one portion of overhead vapours evolved from the top of said stripping column at a heat-receiving side of said condenser, a pressure at said heat-receiving side being lower than said top pressure, thereby recovering at least one portion of said cooling liquor as vapours, feeding a liquid withdrawn from the bottom of said stripping column to a pressure reduction vessel, subjecting the withdrawn liquid to pressure reduction to a pressure approximately equal to a bottom pressure of said extractive distillation column, thereby generating vapours from the withdrawn liquid, feeding said vapours generated at the heat-receiving side of the condenser to the bottom of said extractive distillation column as at least a part of the heat source therefor and using a liquid withdrawn from said pressure reduction vessel as an extracting agent in said extractive distillation column.

6. A method according to claim 5, wherein boiler feed water is used as said cooling liquor and substantially completely evaporated at the heat-receiving side of said condenser.

7. A method according to claim 6, wherein steam generated at the heat-receiving side of said condenser is used as a heat source for said extractive distillation column.

8. A method according to claim 5, wherein a liquid withdrawn from the bottom of said extractive distillation column is used as said cooling liquor and unevaporated liquid at said heat-receiving side is fed to the upper half section of said stripping column.

9. A method according to claim 5 wherein said stripping column has a concentration section in the upper portion above the feeding stage thereof, said cooling liquid is a liquid withdrawn from said concentration section and being subjected to pressure reduction at the heat-receiving side of said condenser to a pressure under which a temperature of the heat-receiving side is lower than the top temperature of said stripping column and unevaporated liquor at said heat-receiving side is fed to the upper half section of said stripping column.

10. A method according to claim 5 wherein said stripping column has a recovery section in the lower portion below the feeding stage thereof, said cooling liquid is a liquid withdrawn from said recovery section and being subjected to pressure reduction at the heat-receiving side of said condenser to a pressure under which a temperature of the heat-receiving side is lower than the top temperature of said stripping column and unevaporated liquor at said heat-receiving side is fed to the recovery section of said stripping column.

11. A method according to claim 5 wherein a liquid withdrawn from the bottom of said stripping column is used as said cooling liquor and subjected to pressure reduction at the heat-receiving side of said condenser to a pressure under which a temperature of the heat-receiving side is lower than the top temperature of said stripping column.

12. In a method for separating acrylonitrile and acetonitrile which comprises feeding an aqueous solution containing acrylonitrile and acetonitrile to an upper half section of an extractive distillation column using water as an extracting agent, recovering acrylonitrile as overhead vapours from the top of said distillation column, feeding a liquid withdrawn from the lower section of said extractive distillation column to an upper half section of a stripping column, and condensing overhead vapours from the top of said stripping column thereby to recover acetonitrile, the improvement comprising conducting distillation operation under a top pressure of about 0.5 to about 5.0 kg./cm.$^2$ gauge in said stripping column, using substantially all the amount of a liquid withdrawn from the recovery section in the lower portion below the feeding stage of said stripping column as a cooling liquor for a condenser for condensing at least one portion of overhead vapours evolved from the top of said stripping column, subjecting said liquor to pressure reduction at a heat-receiving side of said condenser down to a pressure under which a temperature of the heat-receiving sides is lower than the top temperature of said stripping column, thereby generating and recovering vapours from at least one portion of said liquor, and using unevaporated liquid at the heat-receiving side as an extracting agent in said extractive distillation column.

13. A method according to claim 12 wherein the distillation operation of said stripping column is carried out under a top pressure of about 0.6 to about 3.0 kg./cm.$^2$ gauge, and vapours generated at the heat-receiving side of said condenser are fed as a heat source for said extractive distillation column.

14. A method according to claim 12, wherein a liquid withdrawn from the bottom of said stripping column is used as a cooling liquid for said condenser.

15. A method according to claim 14, wherein the distillation operation of said stripping column is carried out under a top pressure of about 0.6 to about 3.0 kg./cm.$^2$ gauge, and vapours generated at the heat-receiving side of said condenser are fed as a heat source for said extractive distillation column.

References Cited
UNITED STATES PATENTS

| | | | |
|---|---|---|---|
| 2,471,602 | 5/1949 | Arnold | 203—21 |
| 3,265,590 | 8/1966 | Redcay | 203—21 |
| 3,352,764 | 11/1967 | Tyler | 203—78 |
| 3,367,846 | 2/1968 | Uitti et al. | 203—25 |
| 3,399,120 | 8/1968 | Lovett | 260—465.3 |

WILBUR L. BASCOMB, JR., Primary Examiner

U.S. Cl. X.R.

203—78, 79, 88, DIG. 3, DIG. 8; 260—465.9